United States Patent

Baun

[15] 3,636,629
[45] Jan. 25, 1972

[54] HOSE CUTTER

[72] Inventor: Theadore Baun, 231 Bellamy Road, Scarborough, Ontario, Canada

[22] Filed: Oct. 13, 1969

[21] Appl. No.: 865,624

[52] U.S. Cl. .................................................. 30/94, 30/329
[51] Int. Cl. ........................................................ B23d 21/06
[58] Field of Search ................. 30/92, 93, 94, 300, 329, 289

[56] References Cited

UNITED STATES PATENTS 2,254,199   9/1941   Baltuch ................................... 30/289

*Primary Examiner*—Andrew R. Juhasz
*Assistant Examiner*—Michael Koczo, Jr.
*Attorney*—Douglas S. Johnson

[57] ABSTRACT

A hose and pipe cutter for cutting rubber and plastic hoses and pipes substantially perpendicularly to the axis thereof at the point where the cut is made; comprising a holder having a substantially planar upper surface and an indent formed in the holder, and a blade secured to the upper surface of the holder so that a cutting surface projects at least part way across the indent.

5 Claims, 4 Drawing Figures

PATENTED JAN 25 1972 3,636,629

INVENTOR.
THEADORE BAUN

BY Douglas S. Johnson

Attorney

HOSE CUTTER

FIELD OF THE INVENTION

This invention relates to an implement which is particularly intended for use as a hose or pipe cutter.

DESCRIPTION OF THE PRIOR ART when the hose or pipe to be cut is rubber, or a rubberlike or plastic material: and when the hose is either reinforced or solid-walled. For example, automotive mechanics may use the cutter of this invention for cutting radiator hose pipes, high-pressure flexible hydraulic lines etc.; and the cutter is also particularly adapted for use with polyvinyl chloride, polyethylene and acrylonitrile butadiene styrene plumbing pipes such as are very often used in summer houses and cottages. Thus, the hose cutter of this invention may be used with reinforced high-pressure rubber or rubberlike hoses such as those used in the high-pressure side of automotive cooling systems and other automotive fluid systems, and on such household appliances as washing machines and dish washers. As well, the hose cutter of this invention finds use in many plumbing applications, especially with plastic pipe, garden hoses, etc.

Description of the prior Art

In the past, a hose or pipe made of a plastic, rubber, or rubberlike material has very often been cut either with shears or other scissorlike devices, or with a knife such as a pocket knife, linoleum knife, etc. However, cutting a hose or pipe in such manner may damage the end due to compression of the material of the hose or pipe out of its normal cross section, or other causes; and in any event, a clean, right-angled end of the hose after it is cut has been very difficult to accomplish. Very often, especially when knives are used, the end of the hose may not only be cut at an angle to the perpendicular, but it may be badly marked and roughened due to abuse thereto such as the sawing or reciprocal action usually inherent with the use of a knife.

Very often, particularly in automotive vehicles, it has been extremely difficult to remove a hose for purposes of inspection or replacement of the same because of lack of easy working space, or an indirect access thereto. Usually, hoses and pipes are placed over a nipple or other suitable rigid fitting which extends into the hose, and are secured thereto by means of a clamp. The cutter of this invention permits easy removal of the hose from the general vicinity of the nipple by permitting easy cutting of the hose in front of the nipple in the manner discussed hereafter. The breaking of the clamp and the removal of the remaining hose from the nipple are not considerations of the present invention.

Other pipe cutters which have been used with rigid and semirigid plastic pipes include plumber's pipe cutters such as the sort which have a free-wheeling cutting wheel opposed to a pair of riders which swing or reciprocate around the pipe at the position to be cut. It will be seen that the cutter of the present invention may be used with rigid and semirigid plastic pipes in circumstances where the rigidity and hardness of the blade holder and of the blade are properly taken into account. Also, the cutter of this invention may be used with reinforced hoses when the reinforcing material can, itself, be cut by a blade; for example, cotton or nylon fibers.

SUMMARY OF THE INVENTION

This invention teaches a hose and pipe cutter having a replaceable blade, which cutter and blade may each be readily and inexpensively manufactured.

This invention provides a hose and pipe cutter having a blade portion and a blade holder portion including a handle, which cutter may be adapted to hoses and pipes of varying sizes and which will make a cut in the hose or pipe perpendicular to the axis thereof of the place where the cut is made.

BRIEF DESCRIPTION OF THE DRAWINGS

These and other objects and features of the invention will become more evident in the following discussion taken in association with the drawings, in which.

DESCRIPTION OF THE PREFERRED EMBODIMENT

Figure 1:
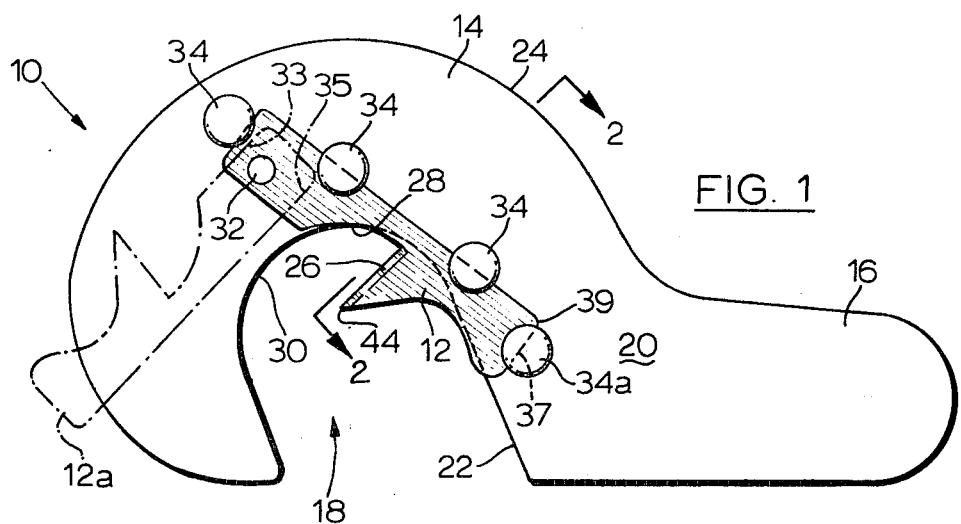
FIG. 1 is a top view of the cutter showing the blade in its operative position on the holder, and also indicating the position of the blade for its removal and replacement.

In this discussion, the word "hose" is used to include hoses and pipes as discussed above and referred to hereafter. Particularly, this discussion contemplates the use of the hose cutter of this invention with rubber and rubberlike hoses both reinforced and nonreinforced, and with rigid and semirigid plastic hoses and pipes such as plumbing pipes made from plastic materials including polyethylene, polyvinyl chloride and acrylonitrile butadiene styrene.

The hose cutter of this invention is shown at 10. It comprises a blade 12 and a blade holder 14 having handle 16 formed at one end thereof. An indent 18 is formed in the plane of the holder 14 for the purposes discussed hereafter. The upper face 20 of the holder 14 is substantially planar except as noted hereafter. There is formed, in the specific embodiment of the holder 14 illustrated, a wall 22 depending downwardly from the upper surface 20 and defining the indent 18, and another wall 24 on the other, outer, side of the holder 14 opposite the wall 22. Walls 22 and 24 have the effect of giving the holder 14 an appreciable thickness; and for this purpose and for economy and ease of manufacture, the holder 14 may be molded from a suitable plastic material such as polypropylene, polystyrene or nylon. Injection molded nylon holders have been found to be very useful. As discussed hereafter, the wall 22 has the effect of guiding the perpendicularity of the cut to be made across a hose by the hose cutter 10 at the place where the cut is needed.

The blade 12 need not be formed having the precise configuration illustrated; but in any event, the blade 12 is formed so as to have a cutting edge 26 formed so that it extends or projects laterally away from the edge of the blade in the plane thereof. In the embodiment shown, the blade has an arcuate indentation 28 forward of the cutting edge 26, and the curve of indentation 28 more or less conforms with the inner extremity 30 of the indent 18 of the holder 14. The length of the cutting edge 26 is immaterial, but is chosen in practice so as to be at least as long as the thickness of the hose being cut, as will appear more evident hereafter. The blade may conveniently be stamped or forged from a suitable material such as high carbon steel, and the cutting edge 26 is usually ground into the blade material using known blade sharpening techniques.

Figure 2:
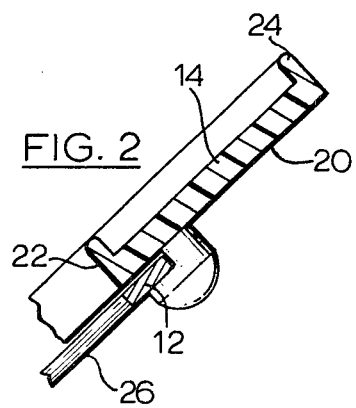
FIG. 2 is a cross section taken along lines 2—2 of FIG. 1.

For purposes of easy mounting and remounting of the blade 12 on the holder 14, pin means 32 is formed on the substantially planar surface 20 of the holder. A hole is placed in a suitable position through blade 12 so that the blade is rotatable about pin 32. It is desirable to retain the blade 12 rigidly on the holder 14, and for this purpose holding clips 34 may be molded onto the top surface 20 of the holder as shown. The precise number and position of the holding clips 34 is immaterial, and this discussion and the illustrations herewith relate to a preferred embodiment having four holding clips 34 as shown. In any event, the holding clips have sufficient clearance between their lower surface and the top surface 40 of the holder 14 to accommodate the thickness of blade 12 (see especially FIG. 2).

To put the blade 12 into its working position on the holder 14—or to remove the blade—it is first necessary to place it in the position shown at 12a in FIG. 1. That is, in the embodiment shown, both the sides 33 and 35 of the blade are clear of both of the holding clips 34 shown to be near pin 32 so that the blade may be lifted upwardly off pin 32. The pin 32 and the holding clips 34 are so positioned that when the blade 12 is rotated about the pin 32 to assume the working position as illustrated, the blade is retained beneath the lower surfaces of the holding clips 34 over portions of the top surface 20. The endmost holding clip indicated at 34a may be so positioned that as the corner 39 and the end 37 of the blade 12 pass by it, a slight overcenter action may be necessary to force the blade past the holding clip 34a and therefore to snap the blade 12 into and out of its working position. Obviously, the holding clips 34 along the side 35 of blade 12 act as stop means to preclude rotation of the blade about pin 32 in counterclockwise direction as viewed in FIG. 1 past those stop means, and thereby to assure the proper relationship of the cutting edge 26 to the indent 18 formed in the holder 14.

The lateral dimension of the indent 18 is substantially constant when measured perpendicularly to either of the defining walls 22, and the inner extremity of the indent 18 is conveniently a semicircle having a radius equal to substantially one-half of the lateral dimension of the indent. Thus, the hose cutter 10 of this invention may accommodate hoses having a diameter of up to the lateral width of the indent 18. Obviously, where the hose cutter is primarily intended for one specific purpose—such as cutting automotive radiator hoses having a diameter of from ¾ to 1 inch, or on the other hand, plastic drainpipes having diameters of from 1½ to 2½ inches—the hose cutter would be of a specific size different than another. The use of different sized hose cutters in differing circumstances may make such use of the respective hose cutter more easy in any such circumstance.

Figure 3:
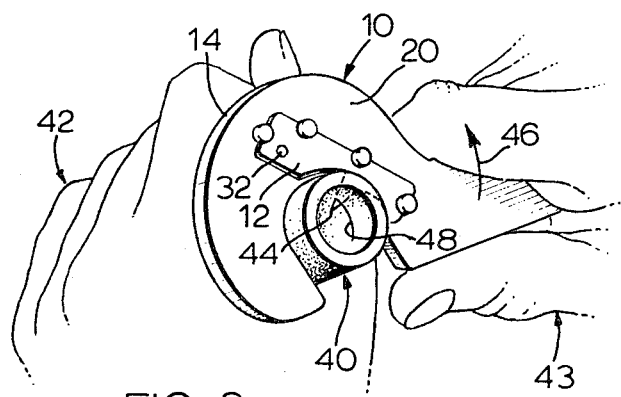
FIG. 3 is a pictorial representation showing the hose cutter of this invention during a cutting operation; and, FIG. 4 is a pictorial representation showing the hose cutter immediately after the completion of a cutting operation.
Figure 4:
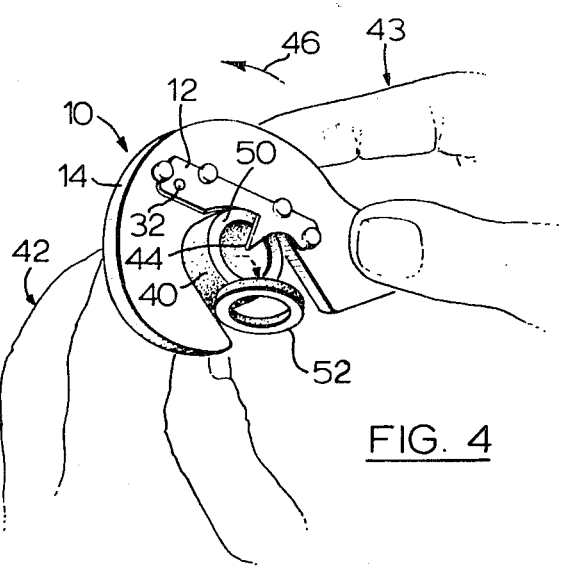

The operation of the hose cutter 10 as illustrated in FIGS. 3 and 4 is as follows:

In the circumstances shown, the hose 40 which is to be cut is shown as being grasped in the left hand 42; but obviously the hose 40 may be otherwise rigidly held as, for example, over a nipple on an automotive radiator. In any event, the hose cutter 10 is placed over the hose 40 in such a manner that the end 44 of the cutting edge 26 of the blade 12 pierces the wall of the house 40. As noted above, it is usual that the length of the cutting edge 26 is greater than the wall thickness of the hose 40 so that end 44 of the cutting edge extends into the interior of the hose 40 and the wall of the hose is completely cut through by the cutting edge 26. The handle portion 16 of the handle 10 may conveniently be grasped in the right hand 43 as shown.

In order to pierce the wall of the hose 40, it may be necessary to begin a twisting action of the cutter 10 around the hose 40 as soon as the tip 44 of the cutting edge 26 contacts the outer surface of the hose wall. Since the tip 44 of the cutting edge 26 is relatively sharp and the material of the blade is considerably harder than the material of the hose, a twisting action of the cutter 10 about the hose 40 will have the effect of forcing the tip 44 into the wall of the hose and at the same time bringing another portion of the outside surface of the hose 40 into contact with the end 30 of the indent 18. After the tip 44 of blade 12 has pierced the wall of hose 40, and at any time during the cutting operation, the relative positions of the hose 40 and the cutter 10 including the blade 12 and tip 44 are substantially as shown in FIG. 3. It will be seen that continued twisting action of the cutter 10, i.e., rotation of the cutter 10 about the hose 40 in the counterclockwise direction as indicated at arrow 46, will have the effect of forcing the cutting edge 26 along a locus so that a continuous cut 48 is made in the wall of the hose 40.

When the wall 22 defining the indent 18 is substantially perpendicular to the upper surface 20 of the holder 14—and thereby also substantially perpendicular to the plane of the blade 12 and the cutting edge 26—it will be seen that a 360° rotation of the cutter 10 around hose 40 as shown in FIGS. 3 and 4 will result in the cut 48 being substantially perpendicular to the axis of the hose 40 at the place where the cut is made. Thus, a clean end 50 is assured when the cut portion as shown at 52 is removed from the hose 40, and there is little likelihood of other cuts at an angle to the end face 50 of the hose 40 being formed or having been made thereat.

It is evident that the precise configuration of the cutter may change depending on the specific purpose for which it is intended and the ease with which the blade portions thereof are to be removed and replaced, etc. For example, the holding clips 34 over edge 35 of the blade 12 may be replaced by one holding clip or a large clip, or otherwise, provided that a stop means is constituted so as to preclude rotation of the blade 12 in a counterclockwise direction around pin 32 beyond the working position, and so that the cutting edge 26 extends partly across the indent 18. Also, whatever stop means are constituted in the manner immediately aforesaid must have sufficient strength so as to retain the blade 12 in its working position while the cutting edge 26 is forced into and around the wall of the hose or pipe being cut. Where the cutting edge 26 extends substantially along a radius of the semicircle formed at the inner end of the indent 18, there will be little lateral force developed across the blade in a direction towards the stop means which are along the edge 35 thereof.

When the wall 22 defining the indent 18 is not substantially perpendicular to the upper surface 20 of the holder 10, and therefore not substantially perpendicular to the plane of blade 12, a helical cut may be formed in the wall of the hose 40.

The ease of operation of the hose 10 of this invention is readily apparent; and it will be noted that a one hand operation of the hose cutter in such relatively inaccessible places as automotive engine compartments and the interior of washing machine cabinets, etc., may conveniently be realized. The economy and ease of manufacture and assembly of the cutter have been noted. Sets of blades having cutting edges 26 of varying lengths may be supplied for different purposes for which the hose cutter may be used; and it will be noted that the hose being cut at any time by the cutter need not necessarily have a diameter equal to the lateral width of the indent 18, although obviously not greater than that dimension.

I claim:

1. A hose cutter comprising blade means and holder means:
   said blade means being substantially planar, and formed so that a cutting edge projects laterally outwardly in the plane of the blade means from an edge thereof;
   said holder means being substantially planar on at least one surface, and having handle means formed at one end thereof;
   an indent formed in said holder means at an angle to said handle means;
   said indent being of substantially constant lateral dimension with a semicircular inner extremity, there being wall means depending from said at least one planar surface and defining said indent;
   said holder means being adapted to receive and releasably retain said blade means on said substantially planar surface so that said cutting edge extends substantially radially of said semicircular inner extremity of said indent.

2. The combination of claim 1 wherein said blade means is formed having hole means near one end thereof, and said holder means has pin means upstanding from said substantially planar surface adapted to cooperate with said hold means so that said blade means is rotatable about said pin means.

3. The combination of claim 2 further comprising holding means upstanding from said substantially planar surface and forming stop means so as to stop rotation of said blade means about said pin means in one direction, said holding means being adapted so as to partially overlie said blade means.

4. The combination of claim 2 wherein said blade means has a lesser width forward of said cutting edge.

5. The combination of claim 2 wherein said wall means depends substantially vertically from said at least one planar side.

* * * * *